United States Patent
Eum et al.

(10) Patent No.: US 7,480,922 B2
(45) Date of Patent: Jan. 20, 2009

(54) DISK DRIVE WITH DISK CARTRIDGE MOUNTED THEREIN

(75) Inventors: Jae-yong Eum, Suwon-si (KR); Yong-hoon Lee, Suwon-si (KR); Hong-kyun Yim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 11/030,994

(22) Filed: Jan. 10, 2005

(65) Prior Publication Data

US 2005/0160436 A1  Jul. 21, 2005

(30) Foreign Application Priority Data

Jan. 15, 2004  (KR) ...................... 10-2004-0002921

(51) Int. Cl.
G11B 33/02  (2006.01)
G11B 17/04  (2006.01)

(52) U.S. Cl. ..................................... 720/607; 360/99.02
(58) Field of Classification Search ................. 720/601, 720/607, 630, 639, 641, 657, 728, 734, 739, 720/740; 369/30.36
See application file for complete search history.

(56) References Cited

U.S. PATENT DOCUMENTS 6,421,311 B1  7/2002  Nakazato et al.
2002/0126413 A1  9/2002  Bagnell et al.
2004/0052167 A1*  3/2004  Tsutsumi et al. .......... 369/30.36
2004/0062175 A1*  4/2004  Inoue ........................ 369/77.2
2004/0255314 A1*  12/2004  Abe et al. .................... 720/656
2005/0081233 A1*  4/2005  Kato et al. ................... 720/739
2005/0097592 A1*  5/2005  Park et al. .................... 720/728
2005/0229194 A1*  10/2005  Kawaguchi et al. ......... 720/630
2005/0240948 A1*  10/2005  Ezawa et al. ................ 720/643
2006/0020954 A1*  1/2006  Inata et al. ................... 720/616

FOREIGN PATENT DOCUMENTS

| EP | 0645768 | 9/1994 |
| JP | 2002-358710 | 12/2002 |
| JP | 2003-208748 | 7/2003 |
| JP | 2003-248999 | 9/2003 |
| WO | WO 2004040569 A1 * | 5/2004 |

* cited by examiner

Primary Examiner—Brian E Miller
Assistant Examiner—Adam B Dravininkas
(74) Attorney, Agent, or Firm—Stein, McEwen & Bui, LLP (57) ABSTRACT

A disk drive including a tray and an opener. The tray includes a disk cartridge mounted thereon and is loaded into and unloaded from a main body. The opener is installed in the main body and elastically contacts a guide formed on the tray. The opener includes a second gear and a first protrusion. The second gear rotates a rotating wheel when in contact with a first gear. The first protrusion formed on a first end of the second gear temporarily rotates the rotating wheel so that the first and second gears can mesh. The guide has a first cam that moves the opener such that the first protrusion does not interfere with the latch when the tray is loaded/unloaded.

11 Claims, 13 Drawing Sheets

DISK DRIVE WITH DISK CARTRIDGE MOUNTED THEREIN

CROSS-REFERENCE TO RELATED APPLICATIONS

This application claims the benefit of Korean Application No. 2004-2921, filed on Jan. 15, 2004, in the Korean Intellectual Property Office, the disclosure of which is incorporated herein by reference.

BACKGROUND OF THE INVENTION

1. Field of the Invention

The present invention relates to a disk drive on which is mounted a disk cartridge to accommodate a disk, which is an information recording/reproducing medium, so as to protect a recording surface of the disk from contamination sources such as dust and fingerprints.

2. Description of the Related Art

As disk capacity increases, information has to be recorded with a higher density in order to accommodate more information on a disk using a similar surface area as that of previous disks. As recording density increases, recording and reproducing information are more easily affected when the recording surface of the disk is contaminated with, as an example, dust and fingerprints. Thus, the usage of a disk cartridge to protect the recording surface of the disk from contamination is likely to become popular.

Such a disk cartridge has an aperture to allow a spindle motor to rotate the disk and an optical pickup to record information to or read information from the recording surface. Additionally, the disk cartridge has a shutter that closes and opens the aperture. Furthermore, the disk cartridge has a latch that locks the shutter so that the shutter does not open due to an external impact when the aperture is closed.

As described above, a disk drive in which the disk cartridge, mounted to record/reproduce information, has to unlock the latch and open the aperture when the disk cartridge is loaded in order to gain access to the disk and/or the information thereon. In addition, the disk drive should be able to lock the shutter so that the shutter does not open after closing the aperture when the disk cartridge is unloaded. That is, if the shutter is not locked firmly, the aperture may be inadvertently opened while moving the disk cartridge and the recording surface of the disk may be contaminated with, for example, dust and fingerprints.

SUMMARY OF THE INVENTION

Therefore, the present invention provides a disk drive that mounts a disk cartridge therein. The present invention also provides a disk cartridge that firmly closes an aperture in the disk cartridge when the disk cartridge is unloaded.

According to an aspect of the present invention, a disk cartridge, including a case having an aperture, a disk placed inside the case, a rotating wheel with a first gear on an outer circumference for rotating the rotating wheel to open and close the aperture, and a latch that locks the rotating wheel when the aperture is closed, is mounted in a disk drive. The disk drive includes a main body; a tray on which the disk cartridge is mounted, the tray being loaded into and unloaded from the main body; a guide formed on the tray; and an opener installed in the main body and elastically contacting the guide. The opener comprises a second gear that rotates the rotating wheel while being coupled to the first gear; and a first protrusion formed at a first end of the second gear, the first protrusion temporarily rotating the rotating wheel such that the first and second gears can mesh.

The guide includes a first cam that moves the opener such that the first protrusion does not interfere with the latch when the tray is loaded/unloaded.

According to another aspect of the present invention, a disk cartridge, including a case having an aperture, a disk placed inside the case, an opening and closing unit including a first gear and opens and closes an aperture, and a latch that locks the opening and closing unit when the aperture is closed, is mounted in a disk drive. The disk drive includes a main body; a tray on which the disk cartridge is mounted on, the tray being loaded into and unloaded from the main body; a guide formed on the tray; and an opener pivotably installed in the main body. The opener includes a second gear operating the opening and the closing unit while being coupled to the first gear; a first protrusion formed at a first end of the second gear, the first protrusion temporarily operating the opening and closing unit such that the first and second gears can mesh; and a second protrusion formed at a second end of the second gear, and elastically contacting the guide.

The guide includes a first cam that pivots the opener such that the first protrusion does not interfere with the latch when the tray is loaded/unloaded.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE PREFERRED EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
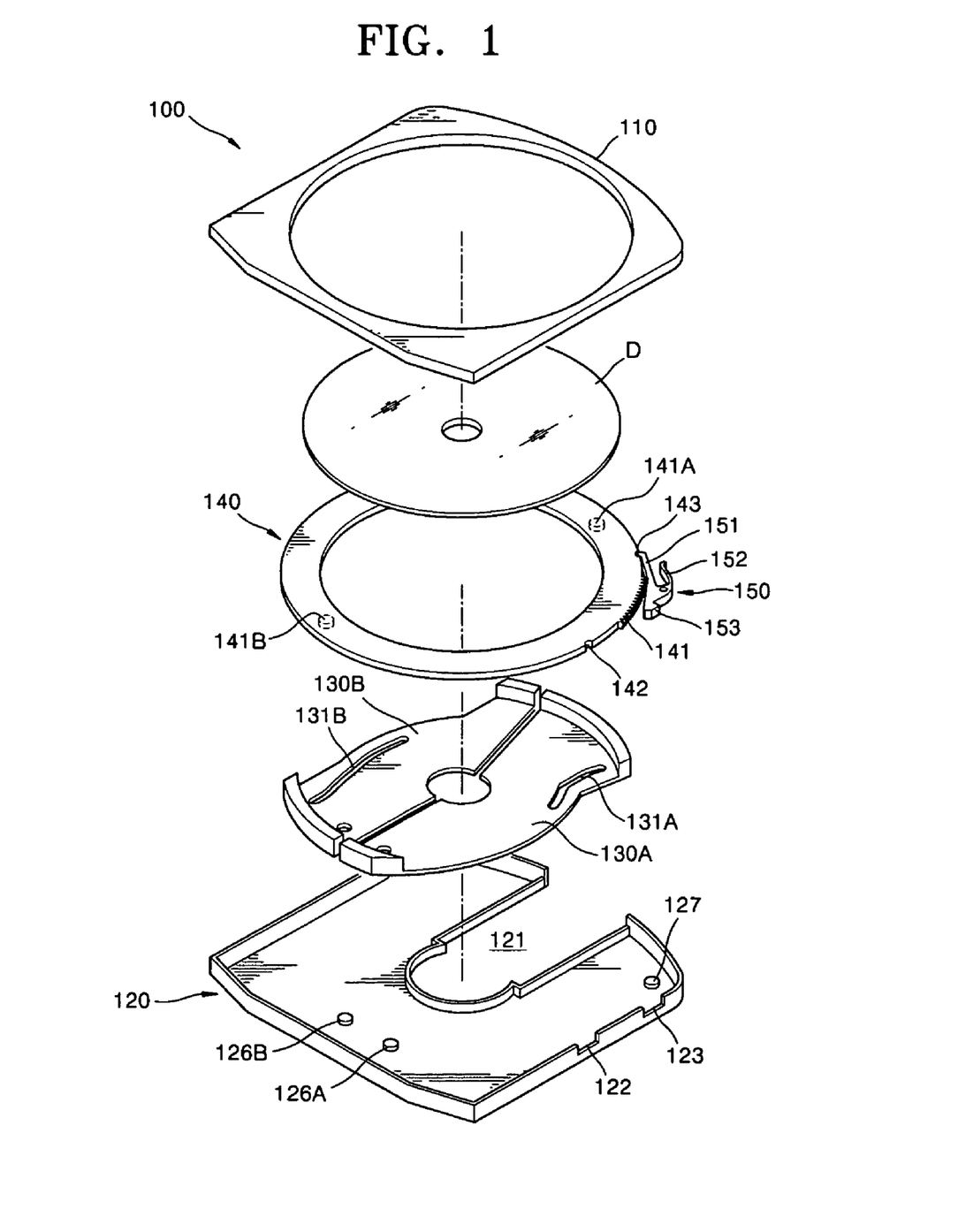
FIG. 1 is an exploded perspective view of a disk cartridge according to an embodiment of the present invention.
Figure 2:
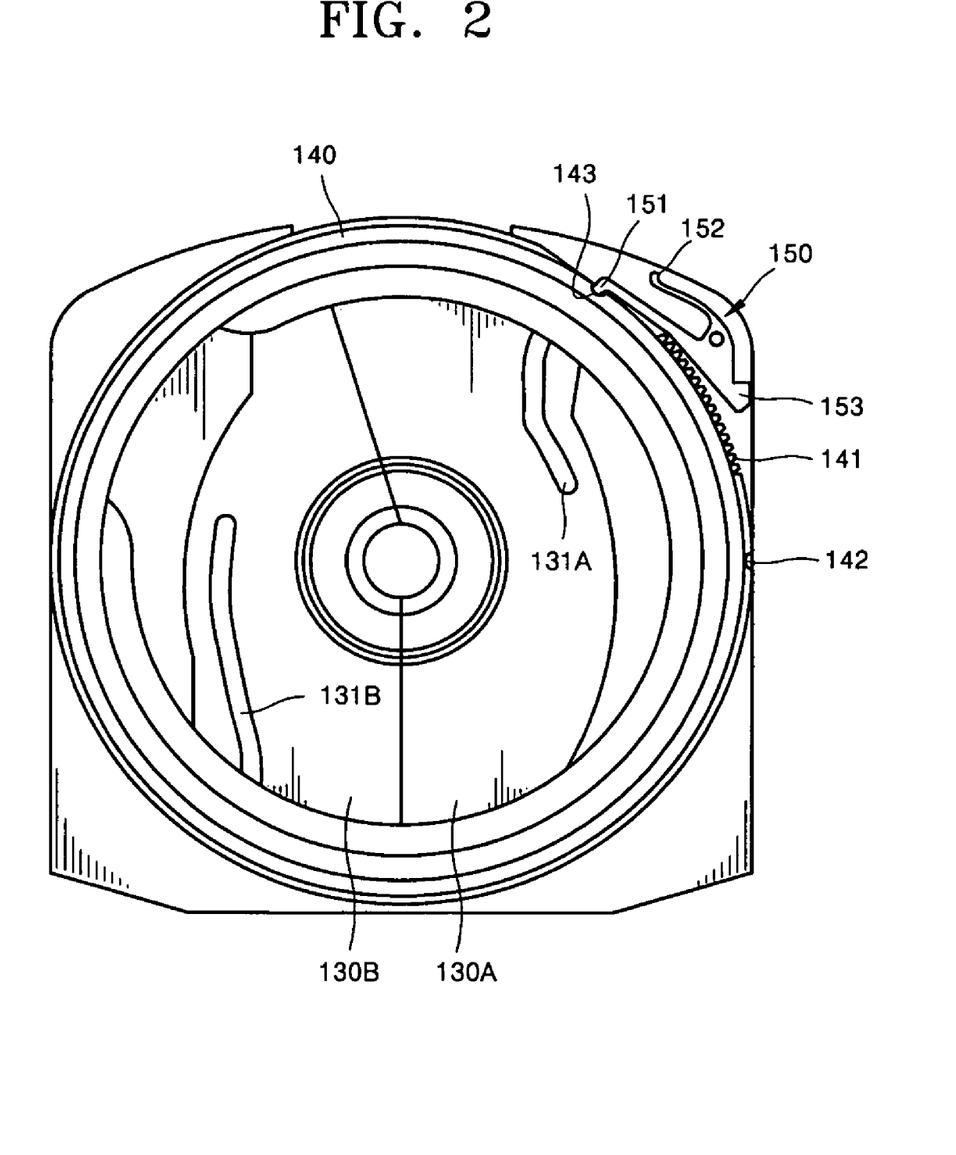
FIGS. 2 and 3 are plan views showing closed and opened states of an aperture of the disk cartridge of FIG. 1, respectively.
Figure 3:
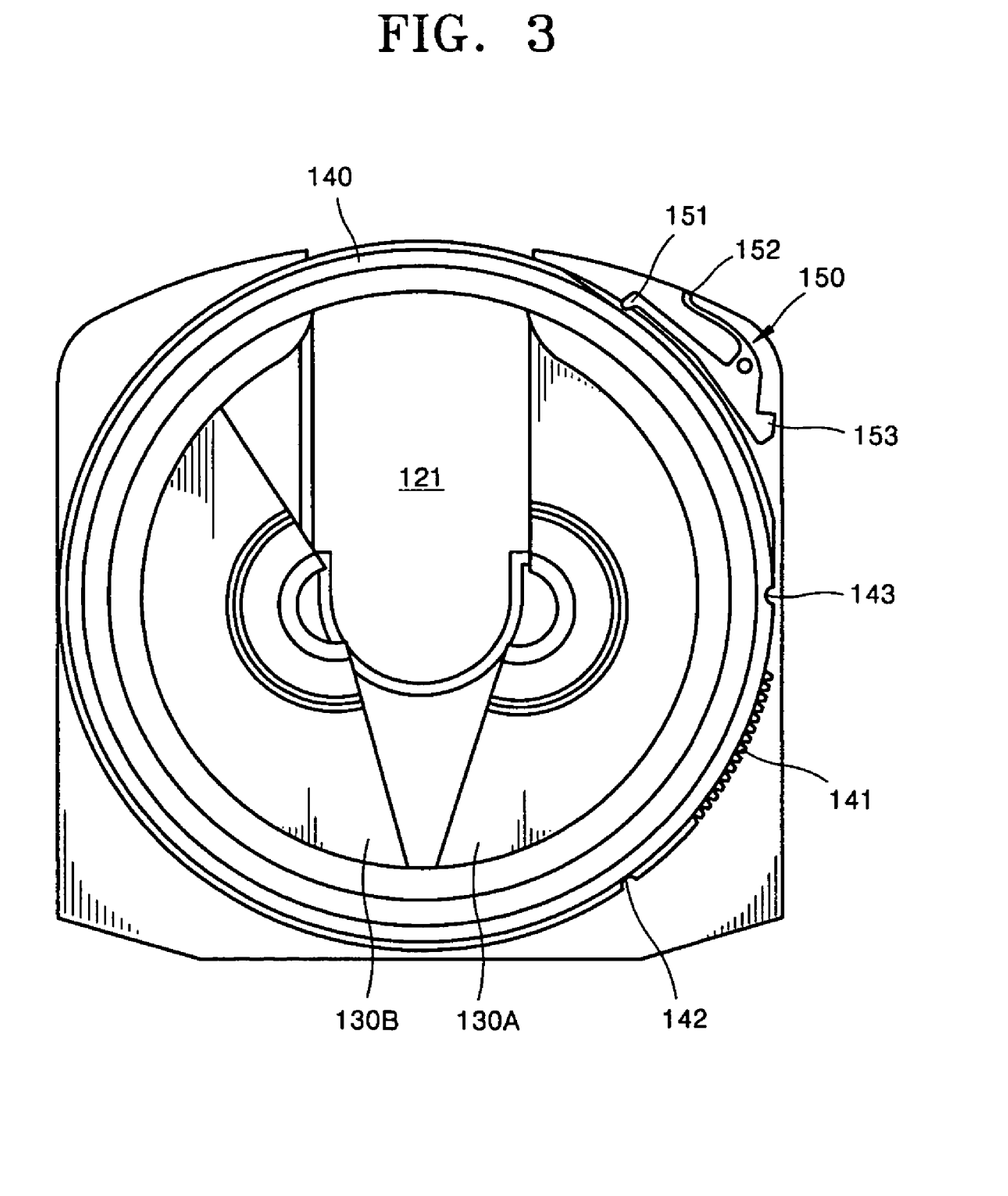

FIG. 1 is an exploded perspective view of a disk cartridge according to an embodiment of the present invention. FIGS. 2 and 3 are plan views showing closed and opened states of an aperture of the disk cartridge of FIG. 1, respectively.

Referring to FIG. 1, a case that accommodates a disk D includes a top case 110 and a bottom case 120 connected together. An aperture 121 is formed in the bottom case 120. The disk D is placed in the case such that a recording surface of the disk D faces the aperture 121. A disk cartridge 100 has an opening and closing unit to open and close the aperture 121. For example, the opening and closing unit includes a pair of shutters 130A and 130B, a rotating wheel 140, and a latch 150. The pair of shutters 130A and 130B are installed such that they pivot about protrusions 126A and 126B, which protrude from the bottom cover 120. The rotating wheel 140 is located on the shutters 130A and 130B. Another pair of protrusions 141A and 141B are formed on the bottom surface of the rotating wheel 140. The pair of protrusions 141A and 141B are inserted into a pair of trajectory paths 131A and 131B formed on the pair of shutters 130A and 130B, respectively. A first gear 141 is formed on the outer circumference of the rotating wheel 140. In addition, first and second coupling grooves 142 and 143 are formed at both ends of the first gear 141 on the outer circumference of the rotating wheel 140. The latch 150 is installed such that the latch pivots about a protrusion 127 that protrudes from the bottom cover 120.

The latch 150 selectively locks the rotating wheel 140, thereby selectively allowing the entire opening and closing unit to operate. The latch 150 has a hook 151 which is coupled to the second coupling groove 143. An elastic arm 152 is elastically biased in the direction the hook 151 is coupled to the second coupling groove 143. The elastic arm 152 pushes against a wall of the bottom cover 120. A first slot 122, which is opened to allow external access to the first gear unit 141 and first and second coupling grooves 142 and 143, and a second slot 123, which is opened to allow external access to the latch 150, are formed on one side of the bottom cover 120.

When the aperture 121 is closed, as shown in FIG. 2, the hook 151 of the latch 150 is coupled to the second coupling groove 143, thereby locking the rotating wheel 140. At this time, the first coupling groove 142 of the rotating wheel 140 and a first end 153 of the latch 150 are externally exposed through the first and second slots 122 and 123, respectively. When the rotating wheel 140 rotates after accessing the latch 150 and the rotating wheel 140 is accessible through the first and second slots 122 and 123, the protrusions 141A and 141B move along the trajectory paths 131A and 131B, and the shutters 130A and 130B move. As a result, the aperture 121, as shown in FIG. 3, is opened.

Figure 4:
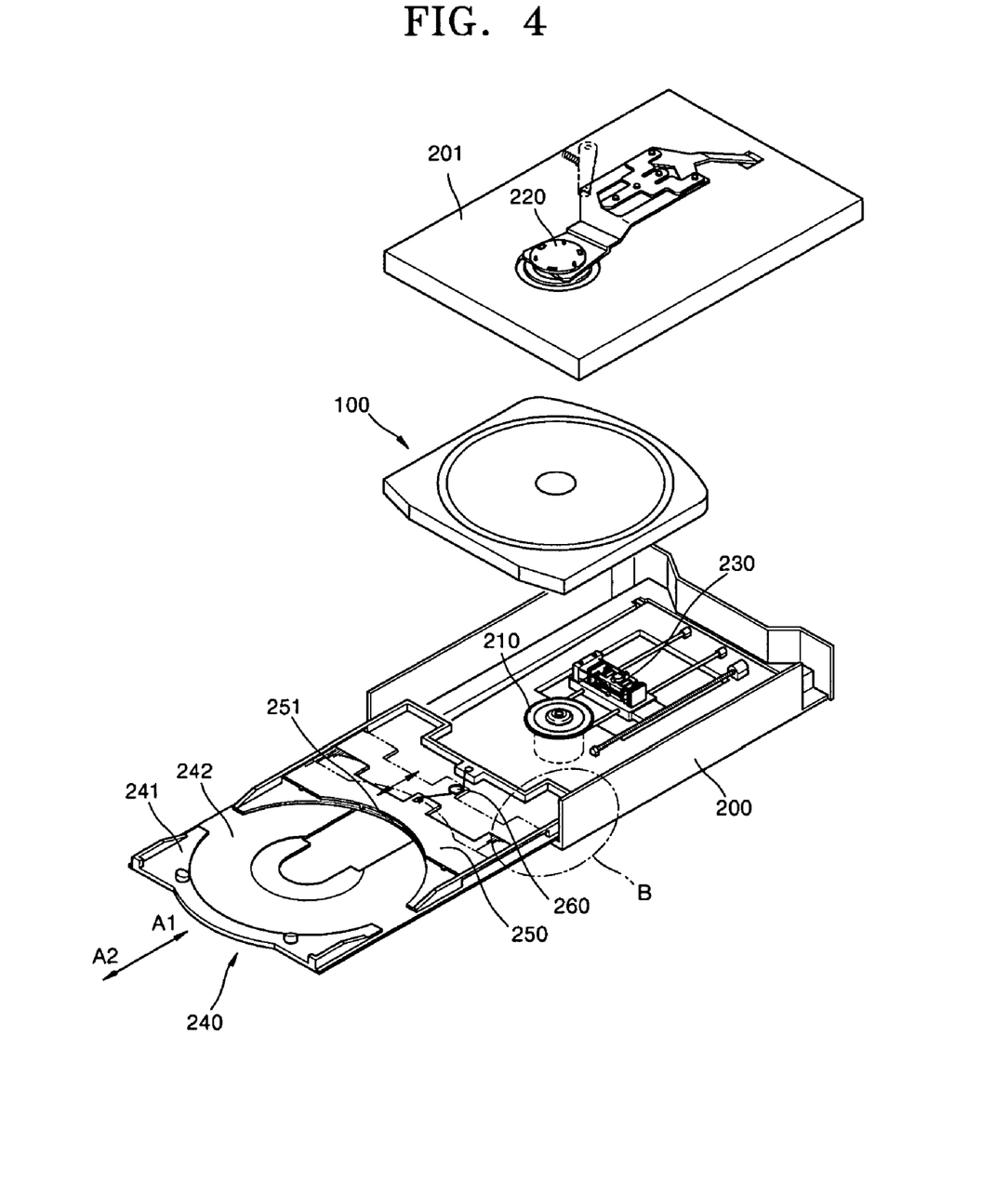
FIG. 4 is a perspective view of a disk drive according to an embodiment of the present invention.

FIG. 4 is a perspective view of a disk drive according to another embodiment of the present invention. Referring to FIG. 4, the disk drive includes a main body 200 including a turntable 210 where a disk D is placed and an optical pickup 230 that performs recording/reproducing to/from the disk D. A tray 240 accommodates the disk D or a disk cartridge 100 with the disk D placed inside and installed to be able to slide into and out of the main body 200. A cover 201 covers the main body 200. A clamper 220 clamping the disk D on the turntable 210 is installed on the cover 201. Arrows A1 and A2, shown in FIG. 4, indicate directions the tray 240 slides in order to be loaded/unloaded.

The tray 240 further includes a cartridge guide 250 which elastically fixes the disk cartridge with the disk D inside to the tray 240 or guides a bare disk D without the disk cartridge 100. The cartridge guide 250 is elastically supported in the tray 240 by a spring 260. The disk cartridge 100 is placed on a first placing surface 241 of the tray 240 and is elastically fixed to the tray 240 by an elastic force produced by the spring 260. In this position, the disk cartridge 100 is able to push the cartridge guide 250 to the location shown in dotted lines in FIG. 4. Meanwhile, when the disk cartridge 100 is removed from the tray 240, the cartridge guide 250 returns to the original location thereof (shown in solid lines in FIG. 4) by the elastic force produced by the spring 260. Further, a curved portion 251 on a front end of the cartridge guide 250 has a curvature, which is almost identical to that of the outer circumference of a second placing surface 242. Therefore, when the bare disk D is placed on the second placing surface 242, the bare disk D is guided by the outer circumference of the second placing surface 242 and the curved portion 251 of the cartridge guide 250.

Figure 5:
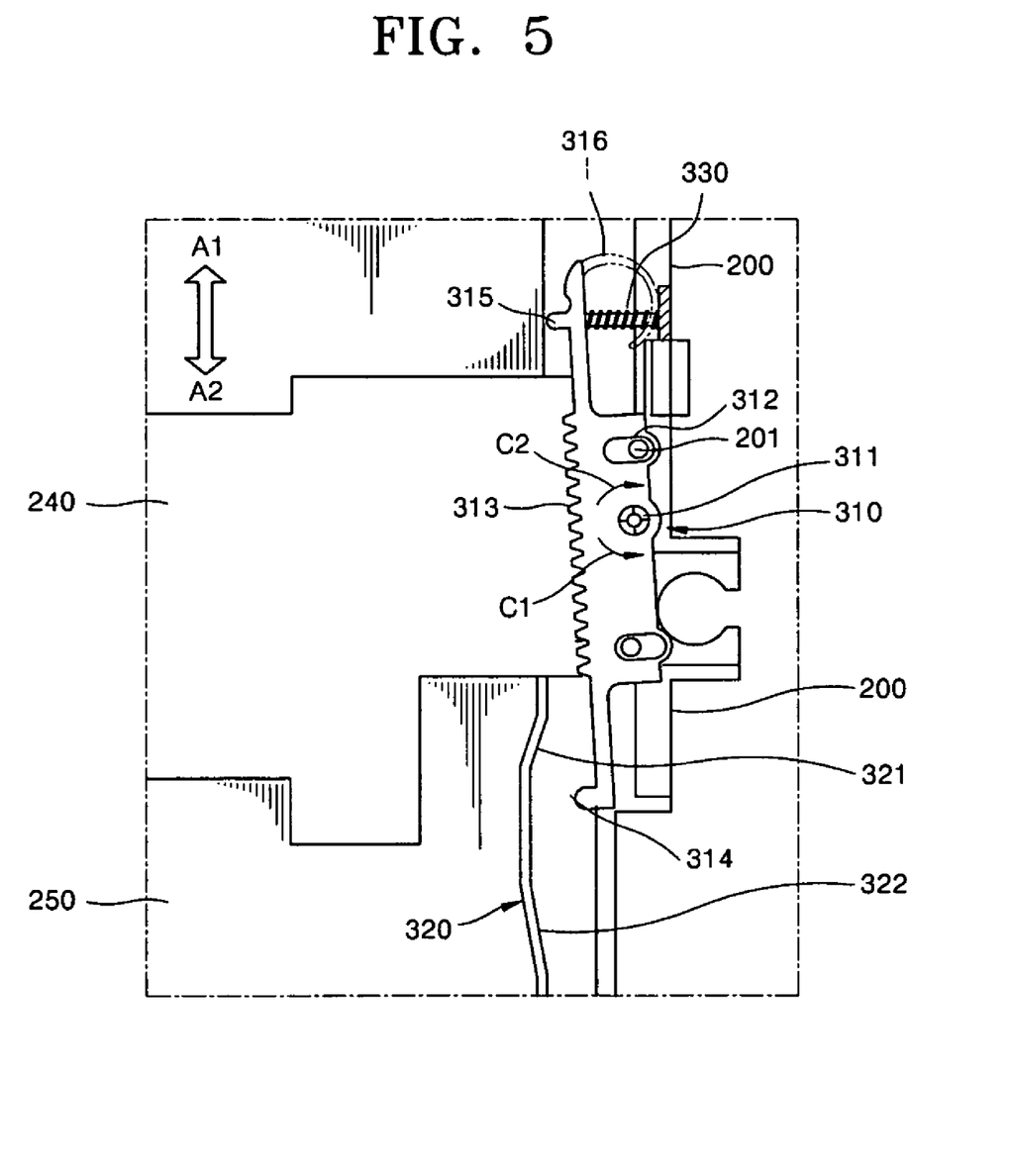
FIG. 5 is a plan view of a region "B" of FIG. 4.

FIG. 5 is a plan view of a region "B" of FIG. 4. Referring to FIG. 5, an opener 310, which operates the opening and closing unit, is installed on one side of the main body 200. In the present embodiment, the opener 310 pivots in the direction of arrows C1 and C2 about a hinge 311. The opener 310 has two slots 312. Two bosses 201, in the form of protrusions, are formed on the main body 200 and are inserted into the two slots 312 to prevent the opener 310 from over-pivoting. Thus, the pivoting direction of the opener 310 is limited by the length of the slots 312. The opener 310 has a second gear 313 that interacts with the first gear 141 (shown if FIG. 1) so as to rotate the rotating wheel 140. A first protrusion 314 is formed at a first end of the second gear 313. The first protrusion 314 couples with the first coupling groove 142 of the rotating wheel 140 and causes the rotating wheel 140 to rotate temporarily until the second gear 313 is coupled with the first gear 141 after the latch 150 is unlocked.

Figure 6:
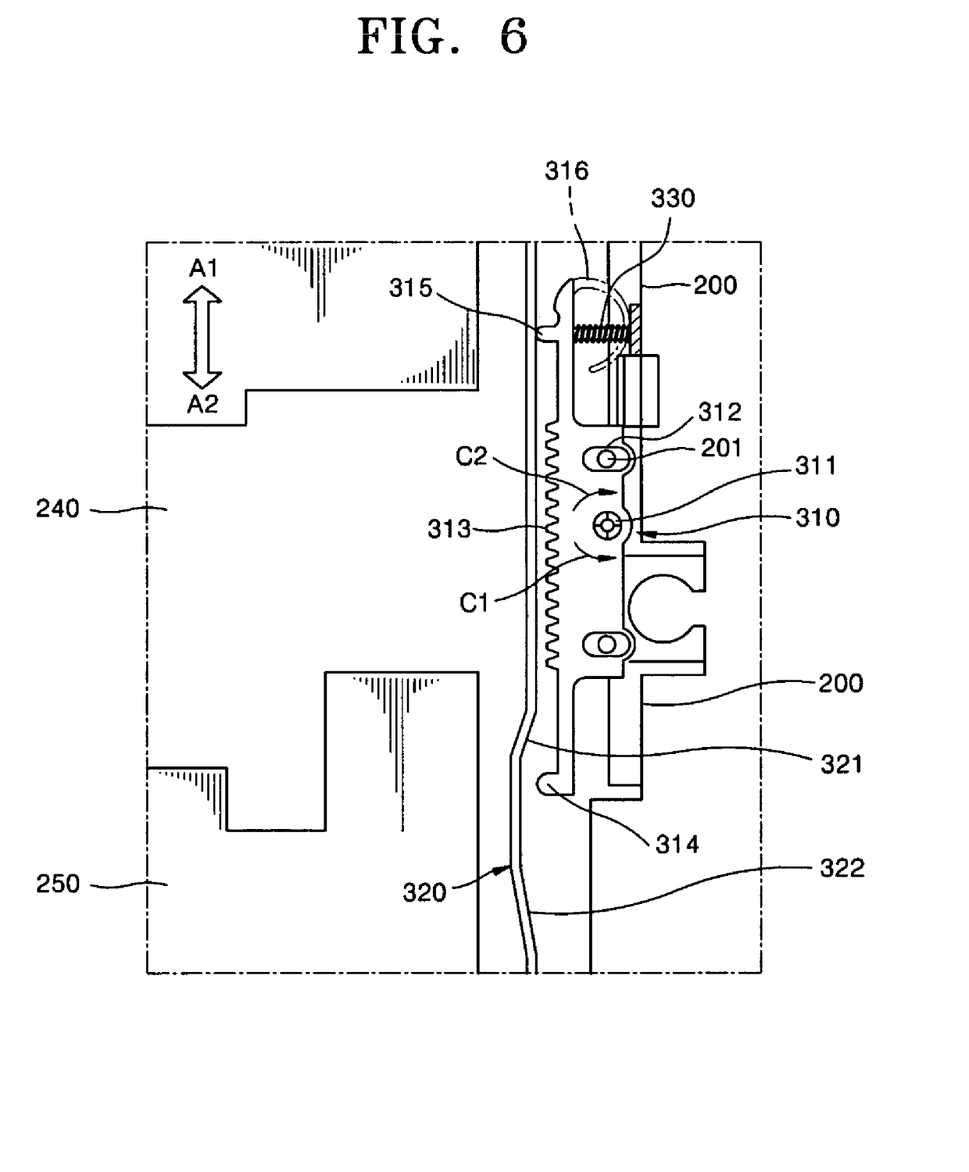
FIG. 6 is a plan view of another embodiment of a guide.

The opener 310 contacts a guide 320. The guide 320 may be formed on one side of the cartridge guide 250, as shown in FIG. 5, or may be formed on one side of the tray 240, as shown in FIG. 6. The case in which the guide 320 is formed on one side of the cartridge guide 250 will be described. The opener 310 of the present embodiment includes a second protrusion 315 at a second end of the second gear 313. The second protrusion 315 elastically contacts the guide 320. The second protrusion 315 may also lock the rotating wheel 140 by coupling with the second coupling groove 143 of the rotating wheel 140 when the aperture 121 of the disk cartridge 100 is opened. Meanwhile, the guide 320 includes a first cam 321. The first cam 321 is slanted so that when the tray 240 slides in the direction of arrow A1, the opener 310 rotates in the direction of arrow C1, which is opposite the direction of arrow C2. The guide 320 may also include a second cam 322. The second cam 322 is slanted so that when the tray 240 slides in the direction of arrow A1, the opener 310 rotates in the direction of arrow C2.

An elastic member 330 elastically forces the second protrusion 315 toward the guide 320. The opener 310 may be typically made of a plastic with elasticity. The second protrusion 315 may also be formed on one side of an elastic arm 316 that extends from the end of the second gear 313, as indicated by the dotted lines in FIGS. 5 and 6. Thus, the opener 310 is elastically connected to the guide 320 by the elastic force of the elastic arm 316.

Figure 7:
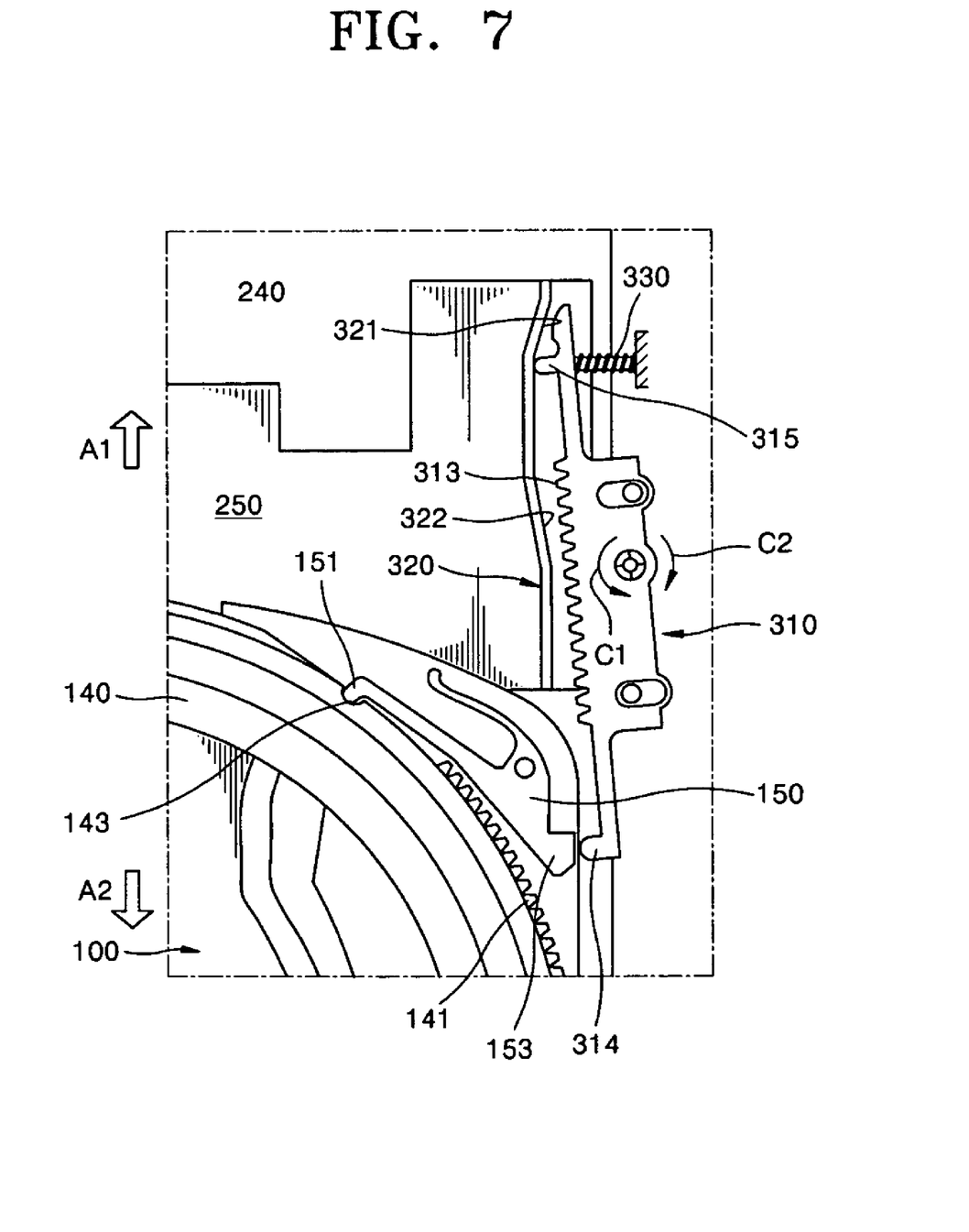
FIGS. 7 through 11 are plan views illustrating a process of loading/unloading the disk cartridge in the disk drive of FIG. 4.

The process of loading/unloading of the disk cartridge 100 will now be described in accordance with the above noted embodiments of the invention. As such, FIGS. 7 through 11, which are plan views to illustrate a process of loading/unloading the disk cartridge 100 in the disk drive of FIG. 4, will be referred to. The disk cartridge 100 is mounted in the tray 240, slides in the direction of arrow A1, and is loaded into the main body 200. As shown in FIG. 7, when the tray 240 slides in the direction of arrow A1 the second protrusion 315 and the first cam 321 come in contact, and the opener 310 rotates in the direction of arrow C1 due to the elastic force of the elastic member 330. As the tray 240 continues to slide in the direction of arrow A1 and the second protrusion 315 comes into contact with the second cam 322, the opener 310 rotates in the direction of arrow C2. To remove the disk cartridge 100, the tray 240 slides in the direction of arrow A2 to be unloaded from the main body 200. When the tray 240 slides in the direction of arrow A2, the second protrusion 315 contacts the second cam 322 and then the first cam 321. In this case, the opener 310 rotates in the direction of arrow C1 due to the elastic force of the elastic member 330, then in the direction of arrow C2.

The cartridge guide 250 moves to the location shown in dotted lines in FIG. 4 when the disk cartridge 100 is mounted on the first placing surface 241 of the tray 240. The disk cartridge 100 is elastically fixed to the tray 240 by the elastic force of the spring 260. At this time, the rotating wheel 140 does not rotate since the hook 151 of the latch 150 is coupled to the second coupling groove 143 of the rotating wheel 140. Also, the first coupling groove 142 of the rotating wheel 140 and the first end 153 of the latch 150 are externally exposed through the first and second slots 122 and 123, respectively.

When the tray 240 slides in the direction of arrow A1 and is loaded into the main body 200, the first end 153 of the latch 150 approaches the first protrusion 314 of the opener 310. Here, as shown in FIG. 7, the opener 310 rotates in the direction of arrow C1 due to the elastic force of the elastic member 330 when the second protrusion 315 of the opener 310 comes in contact with the first cam 321. At this time, the first protrusion 314 is disposed such that the first end 153 of the latch 150 does not contact the first protrusion 314, as shown in FIG. 7, and the rotating wheel 140 is maintained in a locked state. Also, the shape of the first cam 321 causes the opener 310 to pivot such that the first end of the second gear 313 of the opener 310 does not contact the first end 153 of the latch 150.

Figure 8:
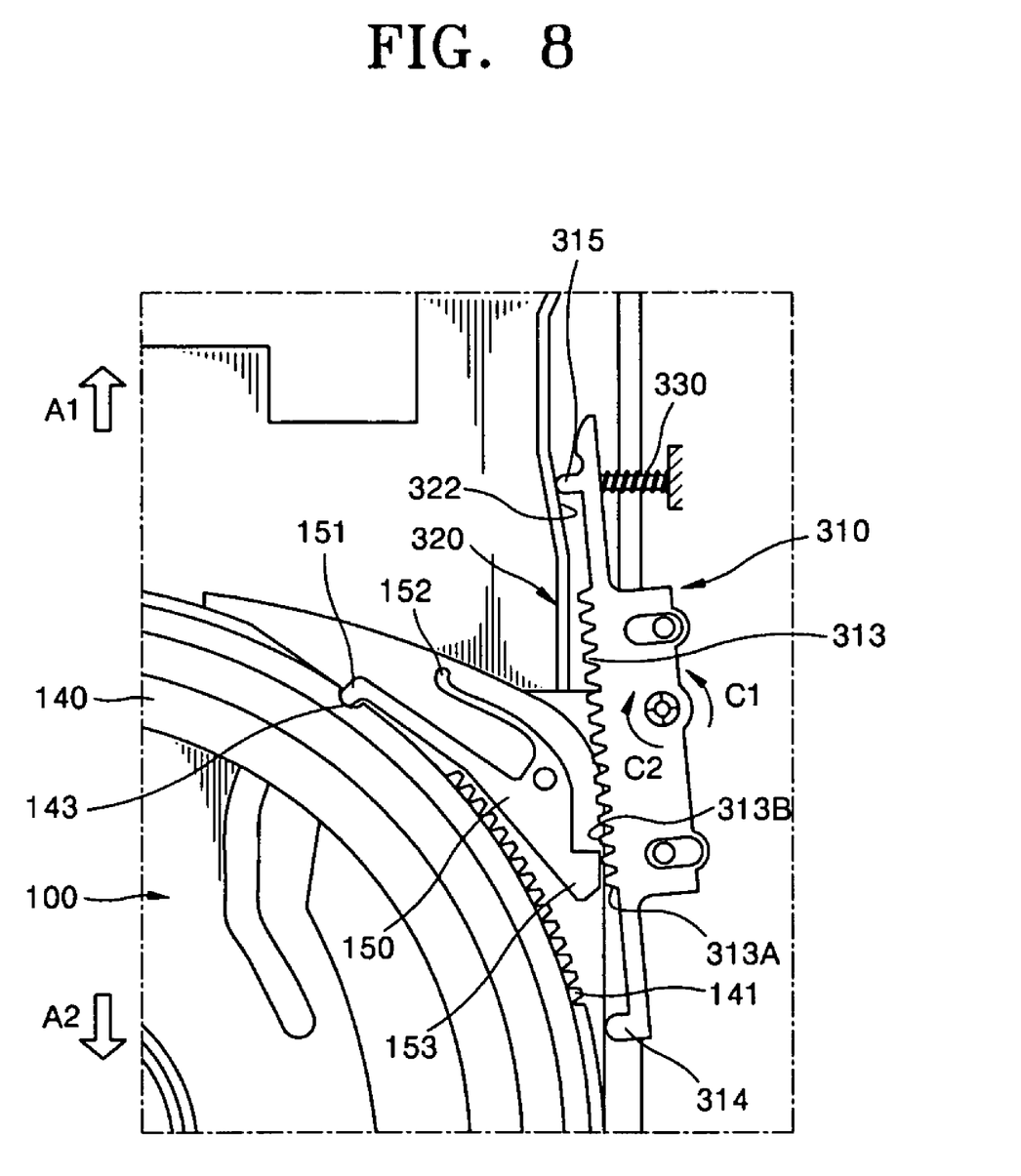
Figure 9:
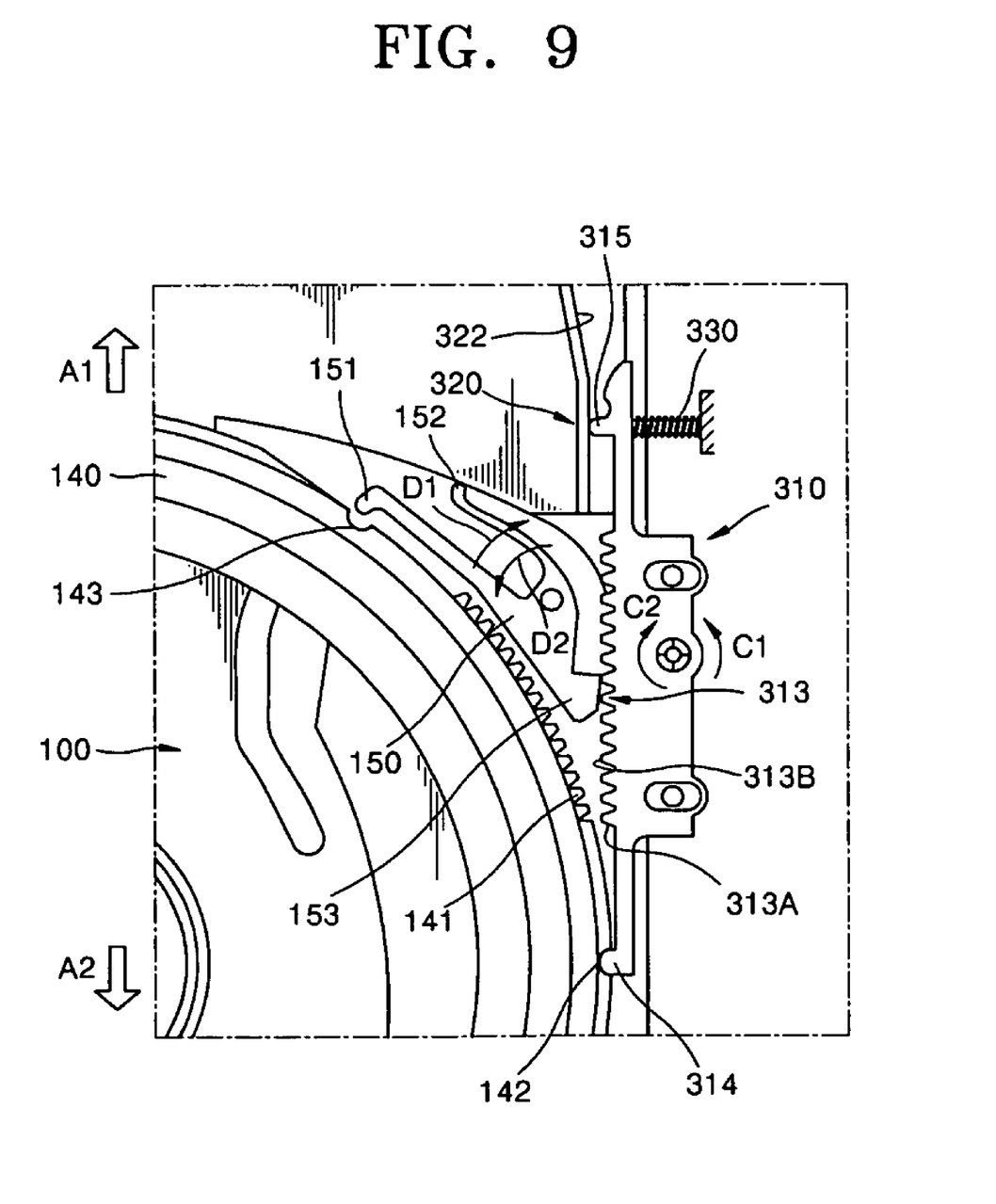

As the tray 240 continues to slide in the direction of arrow A1, the first end 153 of the latch 150 approaches the second gear 313 of the opener 310. Since the opener 310 is rotated in the direction of arrow C1, the top end of the second gear 313 does not contact the first end 153 of the latch 150, as shown in FIG. 8. When the first end of the second gear 313 is adjacent to the first end 153 of the latch 150, the second protrusion 315 contacts the second cam 322, and the opener 310 starts to rotate in the direction of arrow C2. Then, the second gear 313 contacts the first end 153 of the latch 150, and starts to pivot the latch 150 in the direction of arrow D1. When the second protrusion 315 passes the second cam 322, the latch 150 pivots in the direction of arrow D1 until the hook 512 is uncoupled from the second coupling groove 143 of the rotating wheel 140, as shown in FIG. 9. Therefore, the rotating wheel 140 is unlocked. At the same time, the first protrusion 314 of the opener 310 is coupled to the first coupling groove 142 of the rotating wheel 140 through the first slot 122 of the disk cartridge 100, and the rotating wheel 140 starts to rotate, opening the aperture 121, as the tray 240 continues to slide in the direction of arrow A1.

Here, in conventional disk drives, a tooth flank 313A of a second gear 313 would contact a first end 153 of a latch 150 first. This phenomenon tends to produce an annoying contacting noise and may cause damage to the teeth of the second gear 313. However, according to the structure described above, a tooth crest 313B of the second gear 313 comes in contact with the first end 153 of the latch 150. As a result a contacting noise caused by the first gear 141 and the latch 150 is prevented. Thus, damage to the teeth of the second gear 313 is also prevented.

Figure 10:
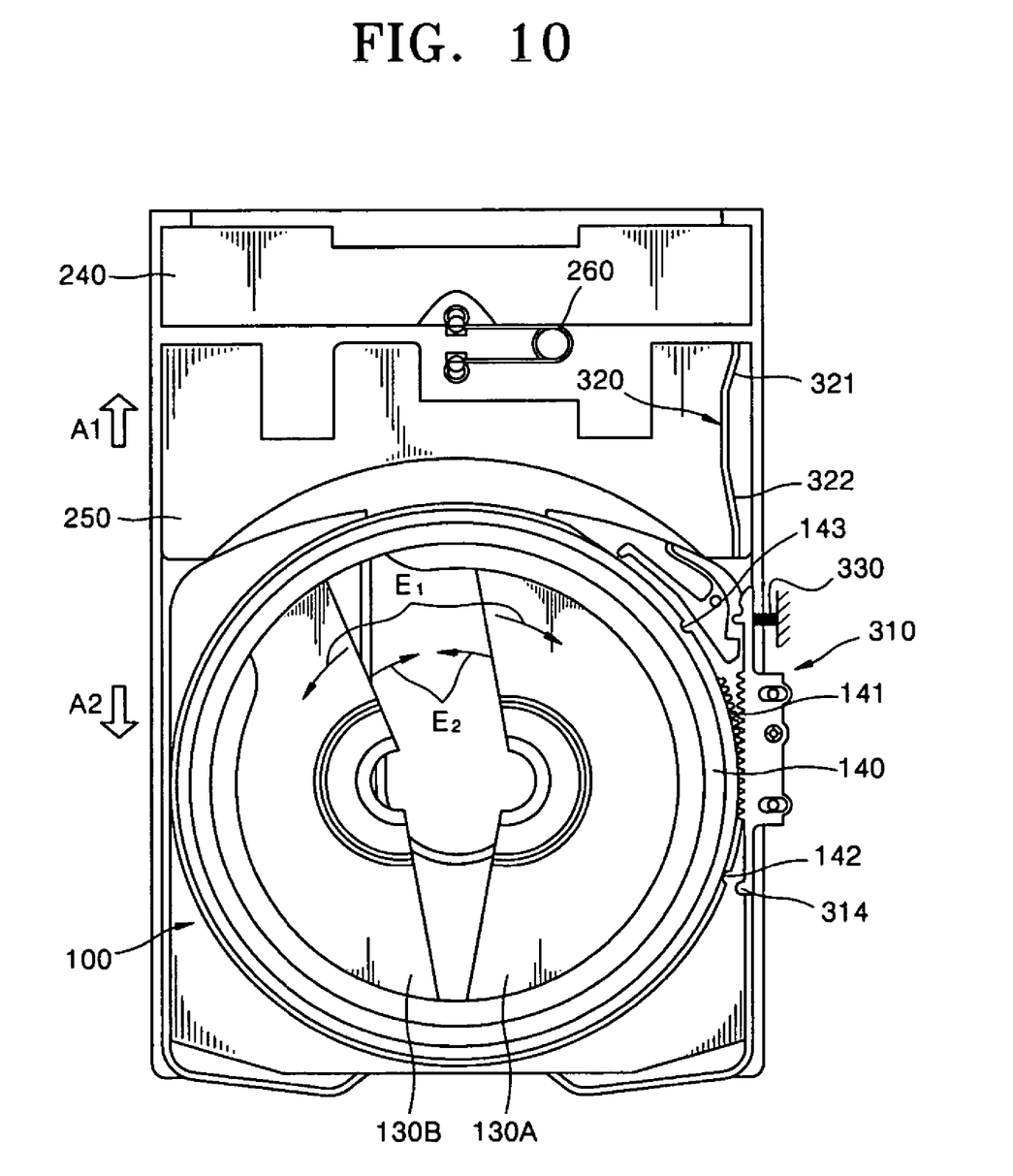
Figure 11:
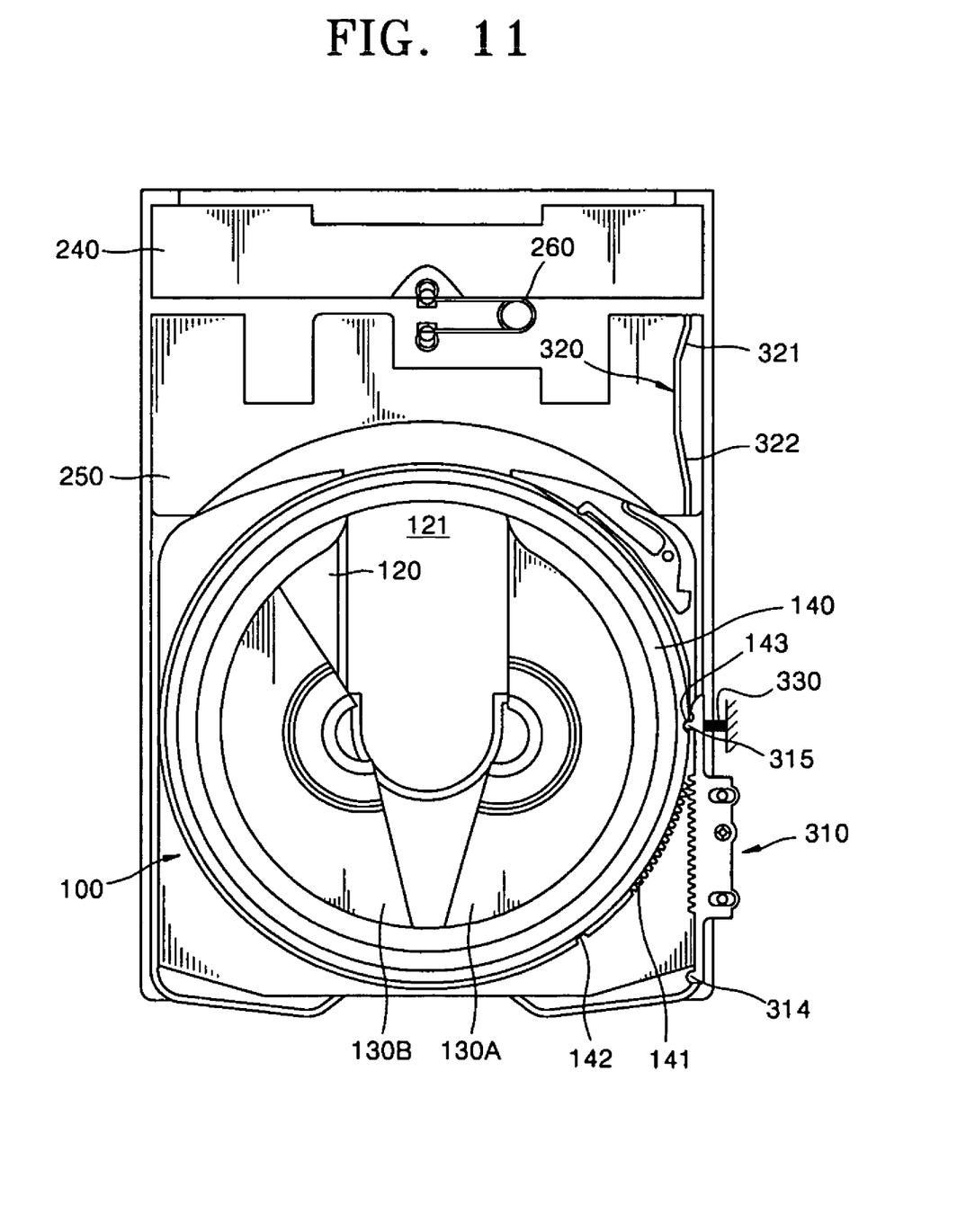

The first protrusion 314 rotates the rotating wheel 140 until the second gear 313 couples with the first gear 141 of the rotating wheel 140. As the tray 240 continues to slide in the direction of arrow A1, the rotating wheel 140 rotates, the shutters 130A and 130B pivots in the direction of arrow E1, as shown in FIG. 10, and the aperture 121 starts to open. When the loading of the tray 240 is completed, the second protrusion 315 is coupled to the second coupling groove 143 of the rotating wheel 140, thereby locking the rotating wheel 140, as shown in FIG. 11. Consequently, the aperture 121 remains an open state when the tray 240 with the disk cartridge 100 mounted thereon is completely loaded into the main body 200.

The process of unloading the tray 240 by sliding the tray 240 in the direction of arrow A2, as shown in FIGS. 4 and 6, is the reverse of the loading process. Following the processes illustrated in FIGS. 11, 10, and 9, the shutters 130A and 130B pivot in the direction of arrow E2 so as to close the aperture 121. When the second protrusion 315 starts to contact the second cam 322, the opener 310 rotates in the direction of arrow C1 due to the elastic force of the elastic member 330, the latch 150 pivots in the direction of arrow D2 due to the elastic force of the elastic arm 152, as shown in FIGS. 9 and 8. As a result, the hook 151 is coupled to the second coupling groove 143. Consequently, the rotating wheel 140 is locked. As the tray 240 continues to slide in the direction of arrow A2, the first protrusion 34 of the opener 310 does not come into contact with the latch 150.

If the first protrusion 314 of the opener 310 does come in contact with the latch 150, the latch 150 could pivot in the direction of arrow D1 and unlock the rotating wheel 140. Then, the disk cartridge 100 could be removed from the tray 240 while the rotating wheel 140 is not locked. When moving the disk cartridge 100 in such a state, foreign substances such as dust could enter the disk cartridge 100 through the aperture 121 because the shutters 130A and 130B would be opened. However, according to the present embodiment, in the process of loading/unloading the tray 240 with the disk cartridge 100 mounted thereon, the first protrusion 314 does not contact the latch 150. Thus, the disk cartridge 100 can be removed from the tray 240 while the rotating wheel 140 is firmly locked.

Figure 12:
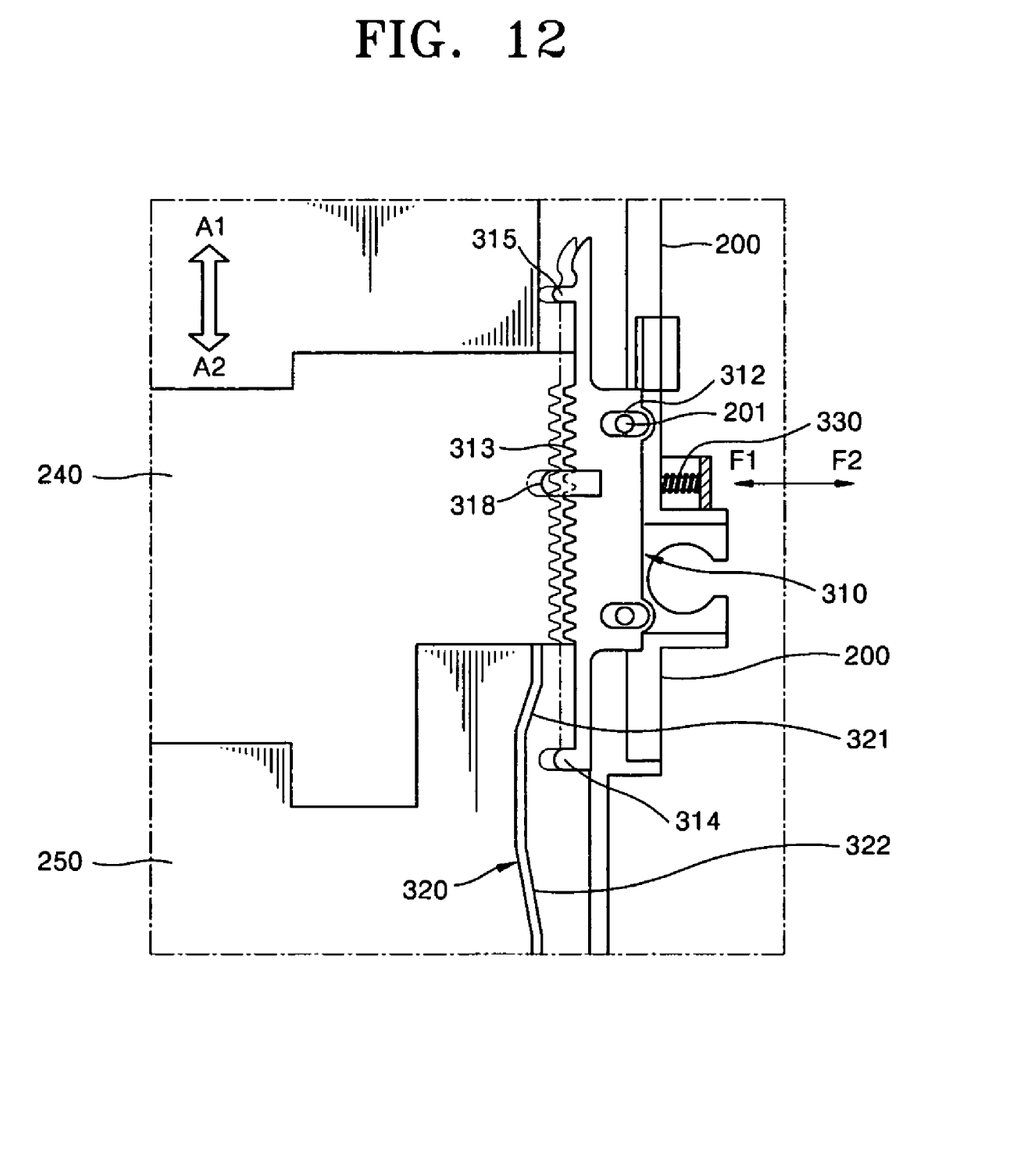
FIG. 12 is a plan view of a disk drive according to another embodiment of the present invention.

FIG. 12 is a plan view of a disk drive according to another embodiment of the present invention. An opener 310 of the disk drive moves in a direction perpendicular to the direction in which a tray 240 moves. Elements with substantially the same function as elements illustrated in FIGS. 1 through 11 have like reference numerals, and their descriptions will not be repeated.

Referring to FIG. 12, the opener 310 is installed on one side of a main body 200. The opener 310 is installed such that the opener is able to move in the direction of arrows F1 and F2, i.e., move in a direction perpendicular to a loading/unloading direction of arrows A1 and A2. To this end, the opener 310 includes two slots 312. Two bosses 201, in the form of protrusions, are formed on the main body 200 and protrude therefrom so as to be inserted into the two slots 312. The opener 310 also includes a second gear 313. A first protrusion 314 is formed at a first end of the second gear 313. A second protrusion 315 may be formed on a second end of the second gear 313. As is described above, the second protrusion 315 is coupled to a second coupling groove 143 of a rotating wheel 140 and locks the rotating wheel 140 while an aperture 121 is opened after a disk cartridge 100 is loaded. A guide 320 is formed on the tray 240. The opener 310 comes in contact with the guide 320. The guide 320 may be formed on one side of a cartridge guide 250 or one side of the tray 240, as described above. The case in which the guide 320 is formed on one side of the cartridge guide 250 will be described. In the present embodiment, a contact portion 318 protruding in the direction of arrow F1 is formed on the opener 310. An elastic member 330 elastically biases the opener 310 such that the contact portion 318 contacts the guide 320, i.e., in the direction of arrow F1.

The guide 320 includes a first cam 321. The first cam 321 is slanted so that when the tray 240 slides in the direction of arrow A1, the opener 310 moves in the direction of arrow F1. The guide 320 can further have a second cam 322. The second cam 322 is slanted so that as the tray 240 continues to slide in the direction of arrow A1, the opener 310 moves in the direction of arrow F2.

The process of loading/unloading the tray 240 with the disk cartridge 100 mounted thereon is the same as the process described with reference to FIGS. 4 through 11, apart from the opener 310 moving in a direction of arrows F1 and F2, and thus will be omitted.

Figure 13:
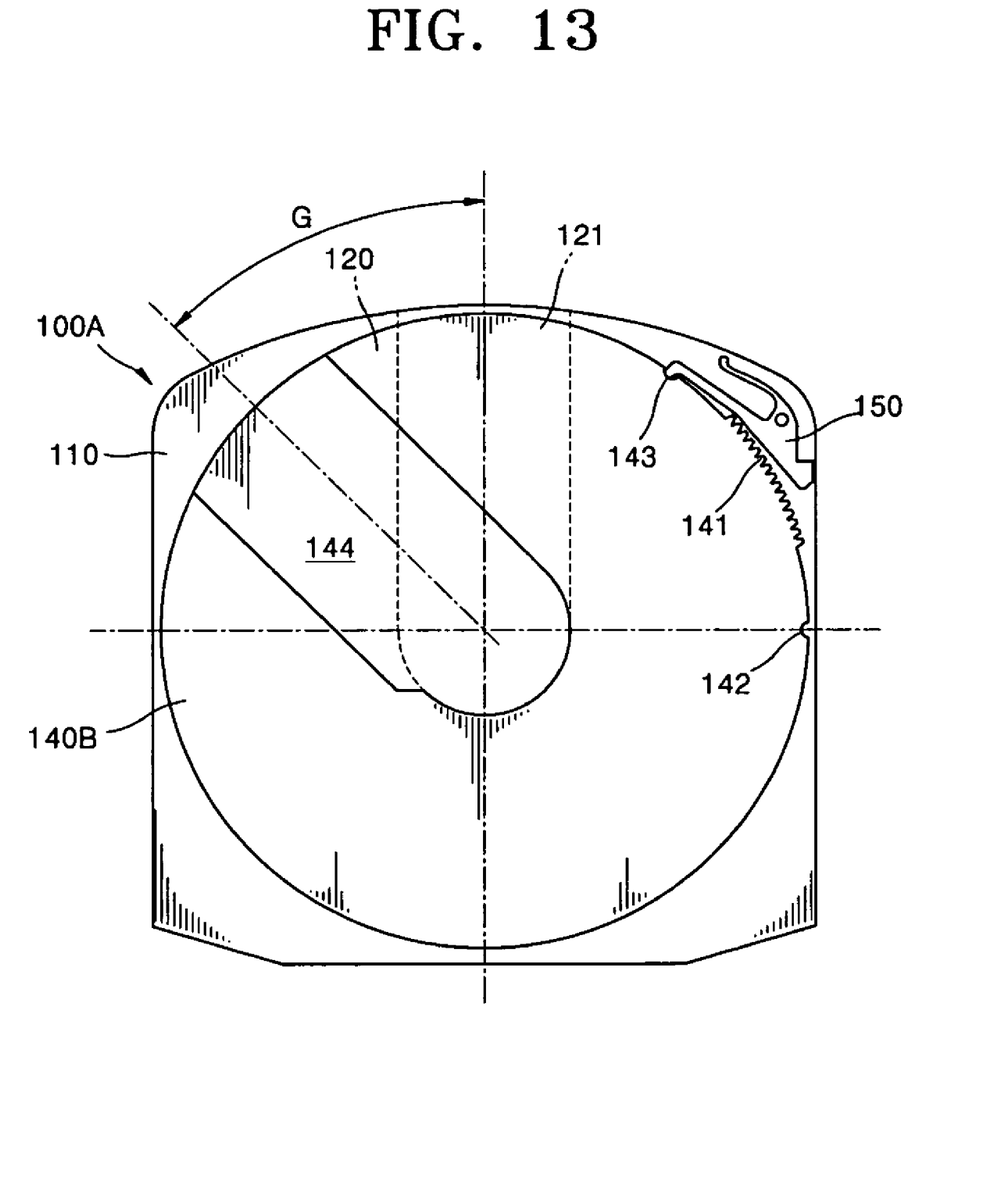
FIG. 13 is a plan view of a disk cartridge mounted in a disk drive according to another embodiment of the present invention.

FIG. 13 is a plan view of a disk cartridge mounted in a disk drive according to yet another embodiment of the present invention. A disk cartridge 100A is similar to the cartridge 100 illustrated in FIGS. 1 through 3, except that a rotating wheel 140A with a second aperture 144 is installed on top of a bottom cover 120, a disk D (not shown) is placed on top of the rotating wheel 140A, and shutters 130A and 130B are not included. An aperture 121 may be opened or closed by rotating the rotating wheel 140A in the direction of arrow G using the opener 310, which causes the second aperture 144 and the aperture 121 on the bottom cover 120 to align and form an opening or separate and close the opening.

The disk cartridge that may be mounted on the disk drive according to embodiments of the present invention is not limited to the embodiments illustrated in FIGS. 1 through 3 and FIG. 13. The disk drive according to the embodiments of the present invention may mount a disk cartridge having various types of latches and rotating wheels.

As is described above, according to embodiments of the present invention, an aperture of a disk cartridge may be completely closed and locked when the disk cartridge is unloaded. Thus, foreign substances such as dust do not enter the disk cartridge through an aperture.

Also, damage to a second gear or a latch and contacting noise can be prevented since a tooth crest of the second gear of an opener pushes the latch and unlocks a rotating wheel.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk drive in which a disk cartridge is mounted, the disk cartridge including a case having an aperture, a disk placed inside the case, a rotating wheel with a first gear on an outer circumference to rotate the rotating wheel to open and close the aperture, and a latch that locks the rotating wheel when the aperture is closed, the disk drive comprising:
   a main body;
   a tray on which the disk cartridge is mounted, the tray being loaded into and unloaded from the main body;
   a guide formed on the tray; and
   an opener installed in the main body, and elastically contacting the guide, the opener comprising:
      a second gear to rotate the rotating wheel while being coupled to the first gear, and
      a first protrusion formed at a first end of the second gear, the first protrusion temporarily rotating the rotating wheel such that the first and second gears mesh, wherein the guide includes a first cam to move the opener such that the first protrusion does not come into contact with the latch while the tray is moving between an unloaded position and a loaded position.

2. The disk drive of claim 1, wherein the first cam moves the opener such that the first end of the second gear does not come into contact with the latch.

3. The disk drive of claim 1, wherein the guide further comprises a second cam that moves the opener such that the second gear pushes the latch and unlocks the rotating wheel.

4. The disk drive of claim 3, wherein the second cam is disposed such that a tooth crest of the second gear pushes the latch when the first end of the second gear is adjacent to the latch.

5. The disk drive of claim 3, wherein the first protrusion starts to rotate the rotating wheel when the latch is uncoupled.

6. The disk drive of claim 1, wherein the opener further comprises a second protrusion formed on a second end of the second gear, the second protrusion locking the rotating wheel when the aperture is opened.

7. The disk drive of claim 1, wherein the opener further comprises a second protrusion at a second end of the second gear, the second protrusion elastically contacting the guide, and the opener being installed to be able to pivot in the main body.

8. The disk drive of claim 7, further comprising an elastic member elastically contacting the second protrusion to the guide.

9. The disk drive of claim 7, wherein the second protrusion is formed on an elastic arm extending from the second gear, and elastically contacts the guide due to an elastic force of the elastic arm.

10. The disk drive of claim 7, wherein the second protrusion locks the rotating wheel while the aperture is opened.

11. A disk drive to mount a cartridge, the cartridge including a case having an aperture, a wheel with a first gear on an outer circumference thereof to rotate the wheel so as to open/close the aperture, and a latch that locks the wheel when the aperture is closed, the disk drive comprising;
   a tray to mount the cartridge, which is loaded/unloaded into/from a body; an opener, installed entirely within the body to elastically pivot while contacting a guide on the tray, including a second gear to rotate the wheel when coupled to the first gear and a first protrusion, at a first end of the second gear, to temporarily rotate the wheel such that the first and second gears mesh; and
   a first cam formed in the guide to move the opener such that the first protrusion does not come into contact with the latch while the tray is moving between an unloaded position and a loaded position.

* * * * *